(12) United States Patent
Koshi et al.

(10) Patent No.: US 8,683,332 B2
(45) Date of Patent: Mar. 25, 2014

(54) DISTANCE FILTERING GESTURE TOUCHSCREEN

(75) Inventors: Valdrin Koshi, Le Kremlin Bicetre (FR); Timo Elliot, Paris (FR); Ali Meziani, Paris (FR); Alexis L. Naibo, Levallois-Perret (FR)

(73) Assignee: Business Objects Software Limited, Dublin (IE)

( * ) Notice: Subject to any disclaimer, the term of this patent is extended or adjusted under 35 U.S.C. 154(b) by 601 days.

(21) Appl. No.: 12/885,912

(22) Filed: Sep. 20, 2010

(65) Prior Publication Data

US 2012/0072840 A1    Mar. 22, 2012

(51) Int. Cl.
*G06F 3/01*    (2006.01)
(52) U.S. Cl.
USPC ............ 715/702; 715/712; 715/738; 715/863
(58) Field of Classification Search
USPC .......................... 715/781, 702, 712, 863, 738
See application file for complete search history.

(56) References Cited

U.S. PATENT DOCUMENTS

| 7,743,337 B1* | 6/2010 | Maeda et al. ................. 715/781 |
| 2010/0094548 A1* | 4/2010 | Tadman et al. ............... 701/209 |

* cited by examiner

*Primary Examiner* — Andrey Belousov
(74) *Attorney, Agent, or Firm* — Buckley, Maschoff & Walwalkar LLC

(57) ABSTRACT

A system may include a display to present a visualization comprising a plurality of graphical indicators, each of the graphical indicators associated with a respective one of a plurality of entities of interest, a touch-sensitive input surface to receive a touch input at a first portion of the visualization representing a current physical location of the apparatus and a drag input on the display device from the first portion to a second portion of the visualization, and a processor to filter the plurality of graphical indicators based on a distance between the first portion and the second portion.
Filtering of the plurality of graphical indicators may include determination of a second distance based on the distance between the first portion and the second portion, and determination of at least one of the plurality of entities of interest, each of the at least one of the plurality of entities of interest located less than the second distance from the current physical location of the apparatus.

10 Claims, 16 Drawing Sheets

DISTANCE FILTERING GESTURE TOUCHSCREEN

BACKGROUND

Modern computing systems provide access to unprecedented amounts of data. A user may, for example, operate a Web-based search engine to search billions of Web pages and retrieve relevant data therefrom. An individual Web site may also provide a "search box" allowing a user to search its constituent Web pages, or may facilitate searching of other sources relevant to a specific topic (e.g., movie showtimes, restaurants, used cars, etc.). Enterprise or other proprietary computing systems may also allow authorized users to search considerable datasets.

The result returned by such searches tend to be cumbersome. A user may be overwhelmed by the number of results, as well by difficulties in meaningfully filtering the results to a manageable number. These difficulties may arise in determining appropriate filtering criteria, and in inputting and applying the filtering criteria. Of course, these difficulties are not limited to filtering search results retrieved from large data sets.

A user may filter search results by adding additional criteria to the original query (e.g., by appending an AND statement). In some examples, a user may filter a set of results by invoking a graphical filter control (e.g., a slider representing a spectrum of values of a particular characteristic of the results), operating a pointing device to "move" the graphical filter control to a desired value (e.g., Max/Min), and selecting a confirmation icon.

Improved systems to filter data are desired. Such systems may leverage graphical indicators and one or more input "gestures" to provide efficient data filtering.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
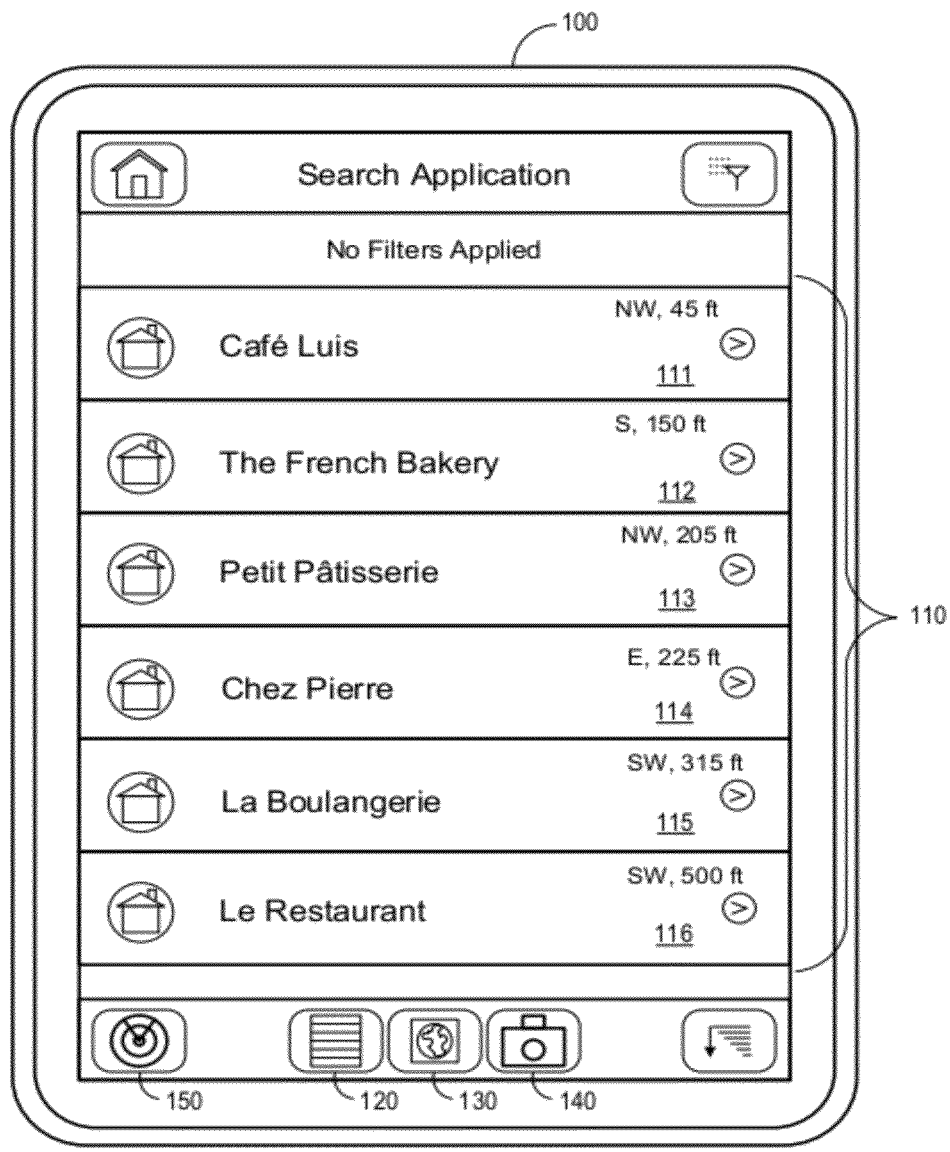
FIG. 1 is a view of a list visualization presented on an apparatus according to some embodiments.

FIG. 1 is a perspective view of apparatus 100 according to some embodiments. Apparatus 100 may comprise a tablet computer, a smartphone, a laptop or netbook computer, and/or any other device or devices suitable to perform all or a part of the functions described herein. Apparatus 100 may include a display to present visualizations and a touch-sensitive input surface to receive input at one or more portions of the visualizations. As will be described in mode detail below, the display and the touch screen may share one or more hardware and/or software elements.

Apparatus 100 of FIG. 1 presents visualization 110. Visualization 110 includes graphical indicators 111 through 116. Each of graphical indicators 111 through 116 is associated with a respective entity of interest. Graphical indicators 111 through 116 may be considered to include any graphic that indicates a particular entity of interest, such as the entire row associated with the entity of interest, the name, the direction and/or the distance. Entities of interest may be represented using any type of graphical indicators. Embodiments are not limited to the graphical indicators and visualizations described herein.

Graphical indicators 111 through 116 are presented in a sort order based on distances associated with their respective entities of interest. These distances represent distances from the current physical location of apparatus 100 to the respective entity of interest. Graphical indicators 111 through 116 may be presented in any sort order.

The entities of interest may have been previously determined by any suitable manner. According to some embodiments, a user of apparatus 100 has invoked an application and operated the application to submit a query (e.g., "French restaurants") to a Web site. In response, the Web site has returned data (i.e., search results) associated with the entities of interest. The returned data is then presented as shown in FIG. 1. In the illustrated example, the entities of interest are French-themed restaurants. The entities of interest may include any entity that may be associated with a physical location (e.g., businesses, landmarks, people, objects, etc.).

Visualization 110 is a list, but embodiments are not limited thereto. In this regard, a user may select icons 120 through 140 to change the visualization type. Icon 120 invokes a list visualization, icon 130 invokes a geographic map visualization, and icon 140 invokes a visualization including a camera-acquired image. Examples of the latter two visualizations are described below. Each visualization includes a plurality of graphical indicators, each of which is associated with a respective entity of interest.

Figure 2:
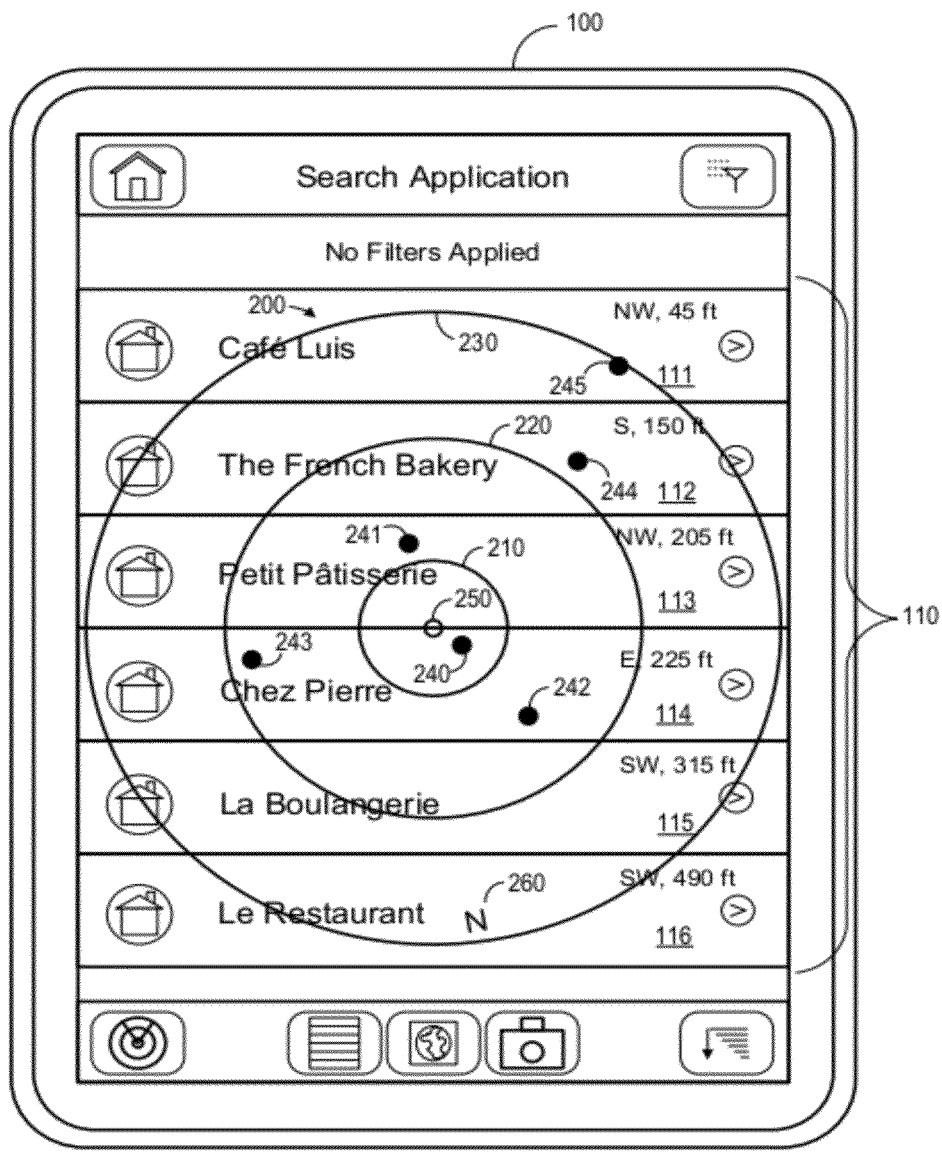
FIG. 2 is a view of a list visualization presented on an apparatus according to some embodiments.

According to some embodiments, a user may select icon 150 to change the presented visualization as shown in FIG. 2. FIG. 2 shows radar 200 including concentric circles 210 through 230. Also shown are graphical indicators 240 through 245. Each of graphical indicators 240 through 245 represents one of the entities of interest that is also associated with one of graphical indicators 111 through 116. More particularly, graphical indicator 240 represents the entity of interest that is associated with graphical indicator 111, graphical indicator 241 represents the entity of interest that is associated with graphical indicator 112, graphical indicator 242 represents the entity of interest that is associated with graphical indicator 113, graphical indicator 243 represents the entity of interest that is associated with graphical indicator 114, graphical indicator 244 represents the entity of interest that is associated with graphical indicator 115, and graphical indicator 245 represents the entity of interest that is associated with graphical indicator 116.

Graphical indicator 250 indicates a portion of visualization 110 that represents a current physical location of apparatus 100. Each of circles 210, 220 and 230 represents a distance from the current physical location of apparatus 100. According to the present example, circle 210 represents a radius of 125 feet, circle 220 represents a radius of 250 feet, and circle 230 represents a radius of 500 feet. Accordingly, the position of each of graphical indicators 240 through 245 within radar 200 is based on a distance from its respective entity of interest to the current location of apparatus 100. The current physical location of apparatus 100 with respect to the entities of interest may be determined using Global Positioning System, assisted Global Positioning System, and/or other locating technologies. Any desirable distance scale, including non-linear scales, may be employed.

According to some embodiments, radar 200 also includes compass heading 260. By orienting radar 200 with true compass headings, a user is able to quickly determine a physical relationship between the location of apparatus 100 (and of the user) and the entities of interest. For example, if apparatus 200 is held by the user as shown in FIG. 2 (i.e., with the heading "Search Application" farthest from the user's body), the user may easily (and correctly) determine that the entity associated with indicator 241 is in front and slightly to the left and the entity associated with indicator 240 is almost directly behind and to the right.

A user may select one of indicators 240 through 245 in order to view information associated with the selected indicator in some embodiments. Such information may comprise a pop-up graphic including information relating to the associated entity of interest, for example. In another example, selection of one of indicators 240 through 245 results in highlighting one of indicators 111 through 116 associated with the same entity of interest.

Embodiments are not limited to a one-to-one correspondence between graphical indicators 240 through 245 and graphical indicators 111 through 116. Additional graphical indicators may be located on radar 200 which are associated with entities of interest that are not presented on visualization 110 due to space constraints (e.g., entities of interest greater than 490 feet from the current location which are listed "below" graphical indicator 116). These additional graphical indicators may appear differently from graphical indicators 240 through 245 (e.g., differently-colored, shaped and/or shaded) according to some embodiments.

Figure 3:
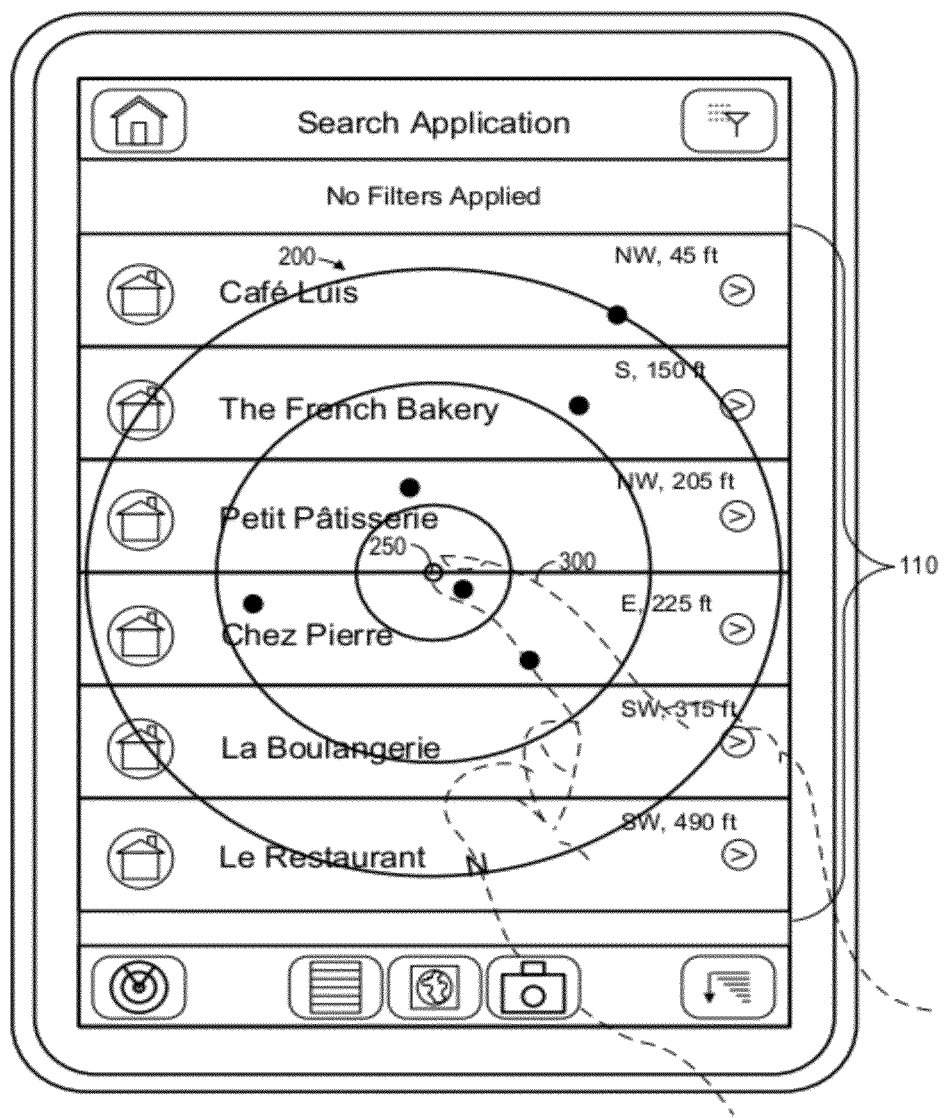
FIG. 3 is a view illustrating a touch input on a list visualization presented on an apparatus according to some embodiments.

FIG. 3 illustrates a touch input received at a first portion of visualization 110. More specifically, user finger 300 touches a portion of apparatus 100 at which graphical indicator 250 is displayed. Accordingly, apparatus 100 receives a touch input at a portion of visualization 110 representing a current physical location of apparatus 100.

Figure 4:
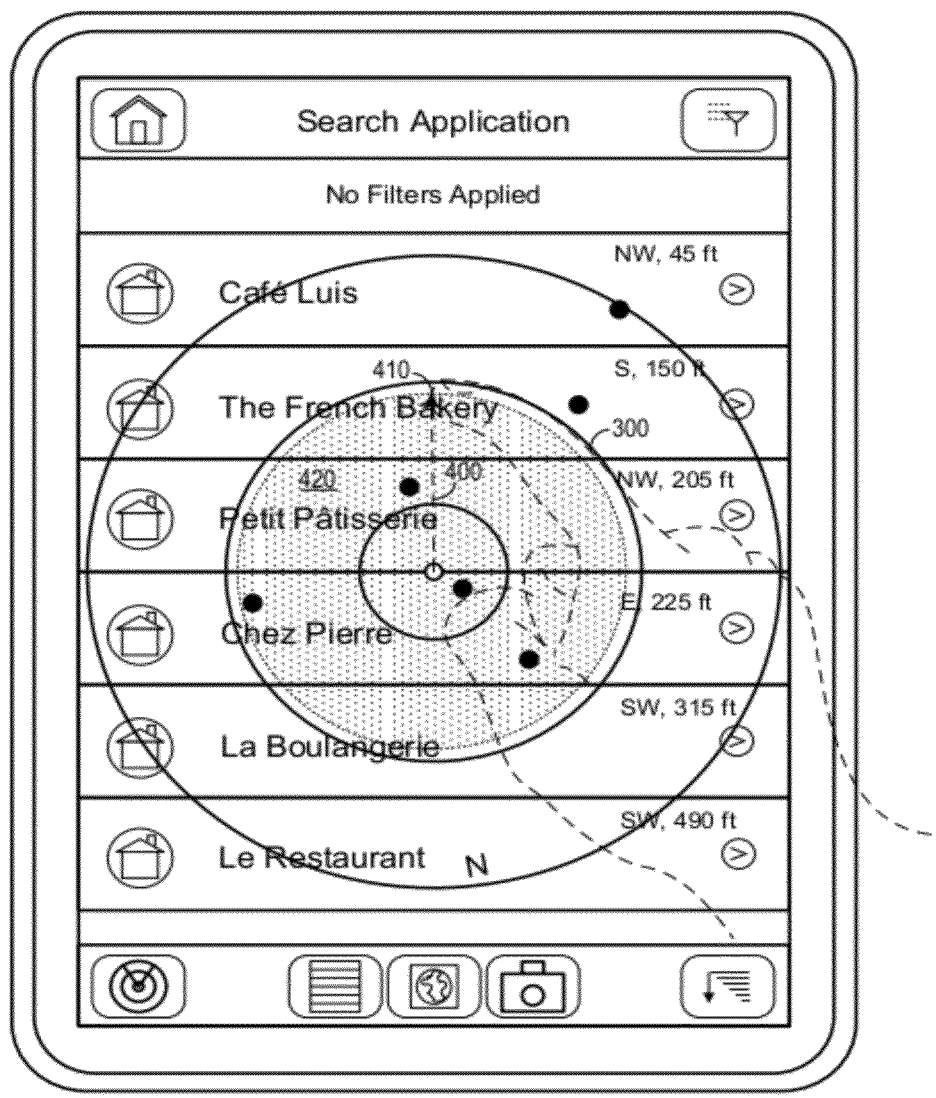
FIG. 4 is a view illustrating a drag input on a list visualization presented on an apparatus according to some embodiments.

Next, as illustrated by arrow 400 of FIG. 4, user finger 300 is dragged upward across apparatus 100 to second portion 410. Also illustrated is circle 420, which is centered at indicator 250 and may grow radially to track the dragging of finger 300 along arrow 400. The touch and drag input illustrated in FIGS. 3 and 4 represents a distance by which the user desires to filter the graphical indicators and, by extension, to filter the associated entities of interest. Embodiments are not limited to the use of circle 420 to represent the distance.

Figure 5:
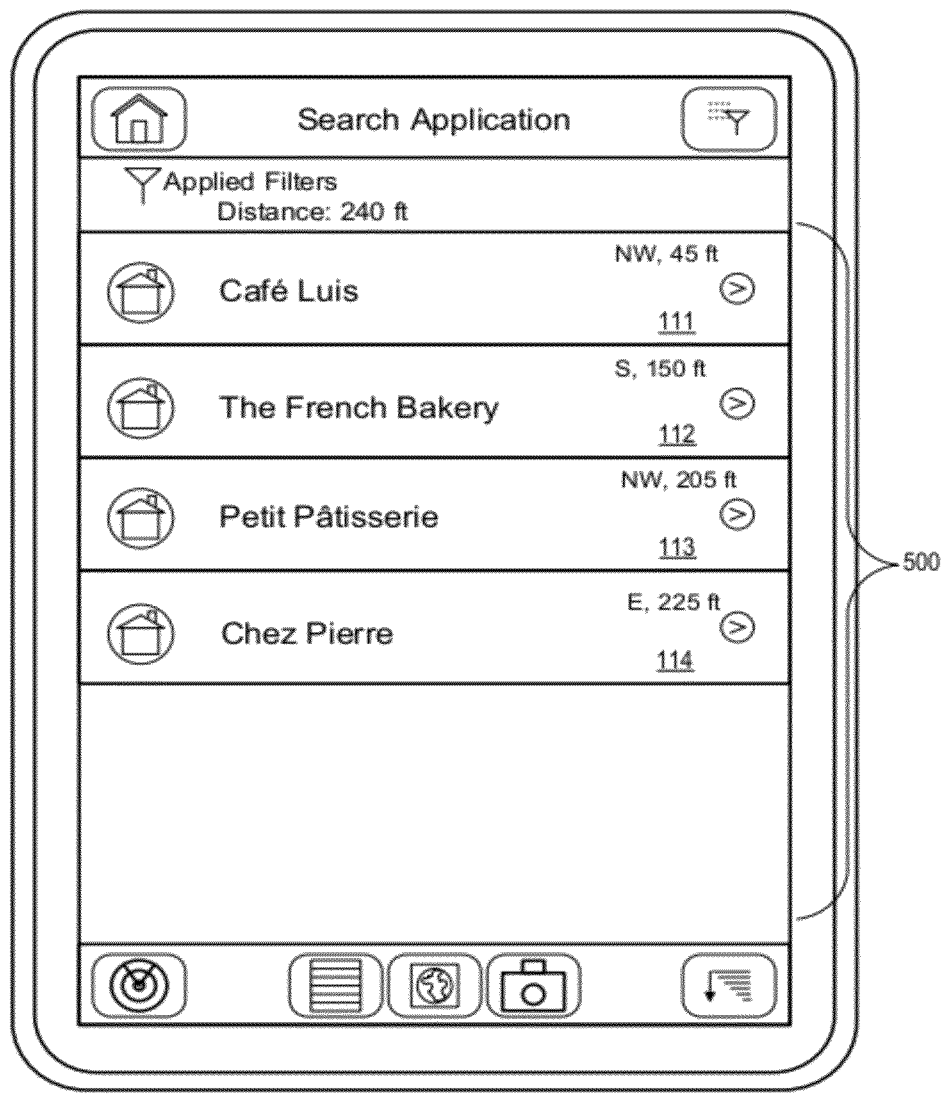
FIG. 5 is a view of a list visualization including filtered graphical indicators presented on an apparatus according to some embodiments.

The entities of interest may be filtered upon release of finger 300 from apparatus 100. FIG. 5 illustrates the presentation of second visualization 500 including a list of the filtered entities of the present example according to some embodiments. Visualization 500 indicates the applied filter (i.e., Distance: 240 feet). Turning back to FIG. 4, each entity listed in second visualization 500 was associated with a graphical indicator located within circle 420.

Figure 6:
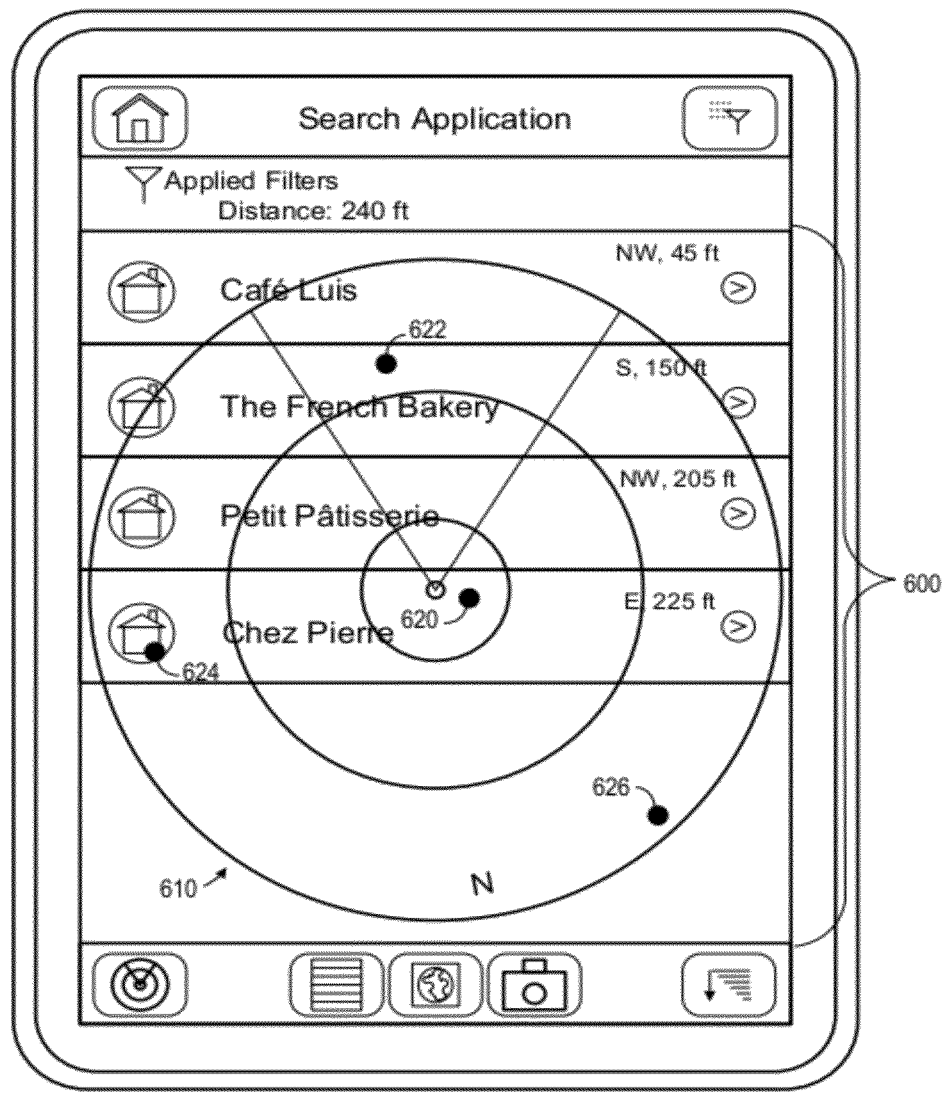
FIG. 6 is a view of a list visualization including filtered graphical indicators presented on an apparatus according to some embodiments.

FIG. 6 shows an alternate view of a second visualization presenting the filtered entities. Second visualization 600 includes the list of the filtered entities as shown in FIG. 5, and also includes radar 610 and graphical indicators 620 through 626. Each of graphical indicators 620 through 626 is associated with a respective one of the filtered entities. The scale of radar 610 has changed to account for the range of distances associated with the filtered entities. The user may interact with visualization 600 as described above to further filter the entities of FIG. 6.

Embodiments are not limited to the appearance of radar 200 or radar 610. For example, some embodiments may provide the above-described filtering without any indications of distance from the current physical location of apparatus 100. That is, the FIG. 2 visualization in some embodiments may include graphical indicators 240 through 245 without circles 210 through 230. Further, some embodiments may allow filtering as described above without the use of graphical indicators 240 through 245. For example, the user may touch a portion of visualization 110 representing a current physical location of apparatus 100 and drag to a second portion to input a distance filter without guidance from either or both of radar 200 and graphical indicators 240 through 245.

Figure 7:
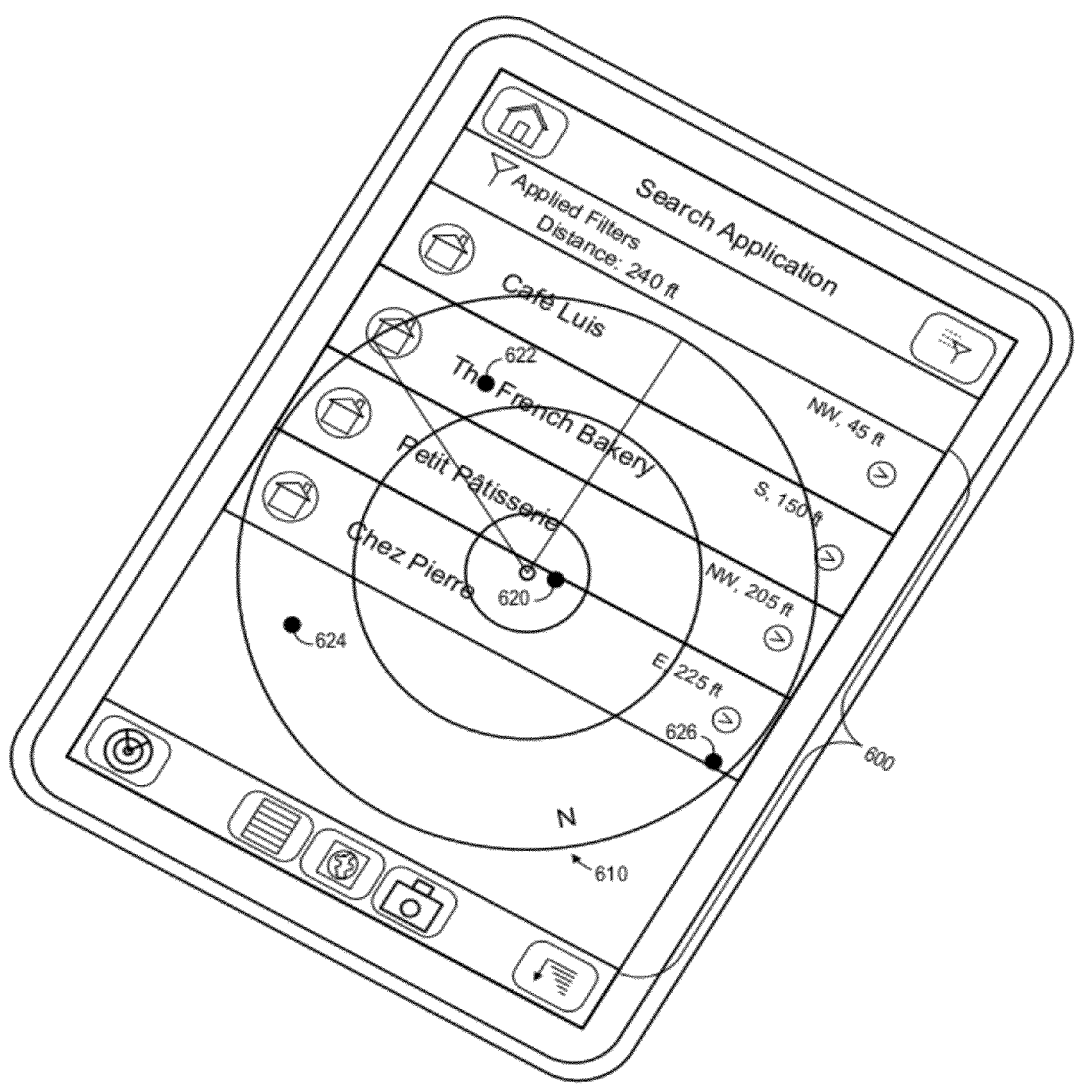
FIG. 7 is a view of a list visualization presented on an apparatus in a skewed orientation according to some embodiments.

FIG. 7 illustrates the effect of rotation of apparatus 100 on the display of a visualization according to some embodiments. Apparatus 100 is rotated clockwise from the position of FIG. 6, while the user remains facing in the same direction in which he was facing in FIG. 6. Accordingly, the direction of North with respect to the drawing sheet is unchanged between FIG. 6 and FIG. 7.

As shown, the orientation of radar 610 and of graphical indicators 620 through 626 is unchanged from FIG. 6 and with respect to the user's orientation. Therefore, as described above, the user is able to easily determine the actual physical locations of the entities of interest without having to first determine the direction in which the user is facing.

Figure 8:
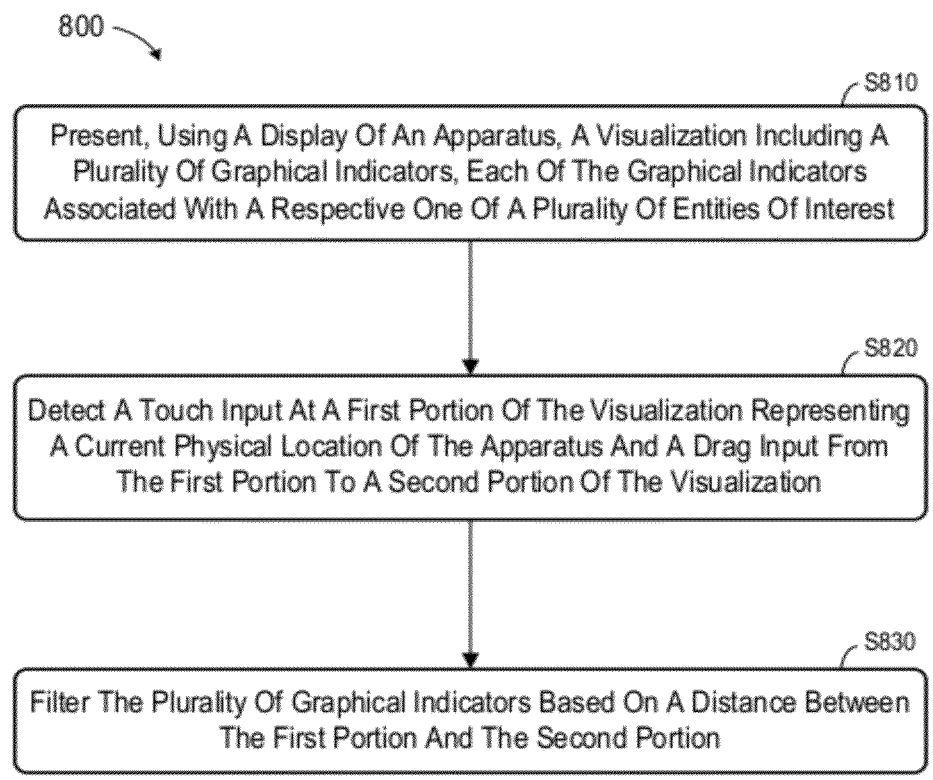
FIG. 8 illustrates a flow diagram of a process according to some embodiments.

FIG. 8 is a flow diagram of process 800 according to some embodiments. FIGS. 1 through 7 illustrate some implementations of process 800, but other implementations and variations will be evident to those in the art. Process 800, and all other processes described herein, may be embodied in program code stored on a non-transitory computer-readable medium and/or implemented by a computer in response to execution of program code by a processor of the computer, but embodiments are not limited thereto.

Initially, at S810, a visualization is presented using a display of an apparatus. The visualization includes a plurality of graphical indicators. Each of the plurality of graphical indicators is associated with a respective one of a plurality of entities of interest. Examples of such a visualization are provided by each of FIGS. 1 through 7.

Next, at S820, a touch input is detected at a first portion of the visualization representing a current physical position of the apparatus. FIG. 3 illustrates detection of a touch input according to some embodiments of S820. As described above, the touch input is detected at indicator 250, which represents a current physical position of apparatus 100. The touch input might not be detected at exactly the position of indicator 250 in some embodiments, but at some nearby position or positions that may be interpreted to also represent a current physical position of the apparatus, thereby providing the user with some margin for error.

Also detected at S820 is a drag input from the first portion of the visualization to a second portion of the visualization. Such a drag input is described above and illustrated in FIG. 4. As also shown in FIG. 4, a graphic may be presented upon detection of the drag input to provide visual feedback for the user. As will be described below, any hardware and/or software arrangement that is or becomes known may be used to present the visualization and detect the touch and drag inputs.

The plurality of graphical indicators are filtered based on a distance between the first portion and the second portion. FIGS. 5 through 7 illustrate the results of filtering according to some embodiments of S830. According to some embodiments of S830, a second distance (e.g., 240 feet) is initially determined based on the distance (e.g., 1.5 inches) between the first portion and the second portion. Then, at least one of the plurality of entities is identified which is located less than the second distance from the current physical location of apparatus 100.

Figure 9:
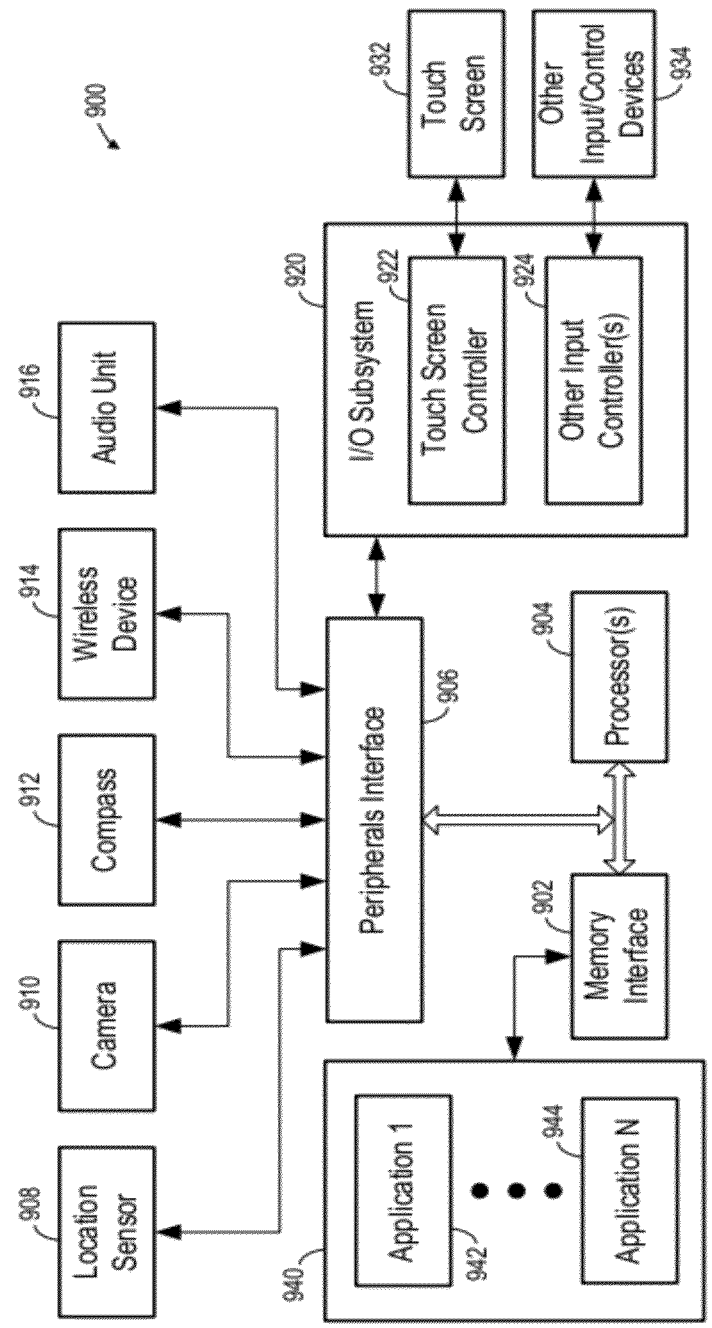
FIG. 9 is a block diagram of an apparatus according to some embodiments.

Reference is now made to FIG. 9, where details of apparatus 900 according to some embodiments are shown. Apparatus 900 may perform any of the processes described herein. Apparatus 100 may comprise an implementation of apparatus 900, but embodiments are not limited to either apparatus 100 or apparatus 900.

Apparatus 500 may include memory interface 902, one or more microcontrollers, image processors and/or central processing units 904, and peripherals interface 906. Memory interface 902, one or more processors 904 and/or peripherals interface 906 may comprise separate components or can be integrated in one or more integrated circuits. The various components in apparatus 900 may be coupled to one another by one or more communication buses or signal lines.

Sensors, devices and subsystems can be coupled to peripherals interface 906 to facilitate multiple functionalities. For example, location sensor 908, camera 910, compass 912, wireless device 914, and audio device 916 may be provided to facilitate the collection, use and interaction with data and information and to achieve the functionality described herein. Some embodiments may provide additional peripheral devices, including but not limited to an accelerometer, a photoelectric device, and a proximity sensor.

Location sensor 908 may include circuitry and sensors for supporting a location determining capability, such as that provided by the Global Positioning System or other positioning system (e.g., systems using Wi-Fi access points, television signals, cellular grids, Uniform Resource Locators (URLs)). In some implementations, any peripheral (e.g., a Global Positioning System receiver) can be integrated into apparatus 900 or provided as a separate device that can be coupled to apparatus 900 through peripherals interface 906 to provide desired functions.

Camera 910 may be located on a back surface of apparatus 900. Camera 910 may capture still images and/or video. Compass 912 may determine an orientation of apparatus 900 with respect to compass headings, and wireless device 914 may include one or more wireless communication subsystems, such as an 802.11b/g communication device, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

Audio unit 916 may include a speaker and a microphone to facilitate voice-enabled functionalities, such as phone and voice mail functions. In some implementations, additional sensors or subsystems may be coupled to the peripherals interface 906 via connectors such as, for example a Universal Serial Bus (USB) port, or a docking port, or some other wired port connection.

I/O subsystem 920 may include touch screen controller 922 and/or other input controller(s) 924. Touch-screen controller 922 may be coupled to touch screen 932. Touch screen 932 and touch screen controller 922 may, for example, detect contact (i.e., touch input), movement (i.e., drag input) and release thereof using any of a plurality of touch-sensitivity technologies, including but not limited to capacitive, resistive, infrared, and surface acoustic wave technologies, as well as other proximity sensor arrays or other elements for determining one or more points of contact with touch screen 932. Other input controller(s) 924 may be coupled to other input/control devices 934, such as one or more buttons, rocker switches, thumb-wheel, infrared port, USB port, and/or a pointer device such as a stylus.

Memory interface 902 is coupled to memory 940. Memory 940 can include high-speed random access memory and/or non-volatile memory, such as one or more magnetic disk storage devices, one or more optical storage devices, and/or flash memory (e.g., NAND, NOR). Memory 940 may store program code of application programs 942-944 which may be executed by processors 904 to cause apparatus 900 to perform the functions described herein.

Memory 940 can store an operating system, such as Android, Darwin, RTXC, LINUX, UNIX, OS X, WINDOWS, or an embedded operating system such as VxWorks. The operating system may include instructions for handling basic system services and for performing hardware dependent tasks. In some embodiments, the operating system can be a kernel (e.g., UNIX kernel). Memory 940 may also store data, including but not limited to documents, images, video files, audio files, and other data.

Figure 10:
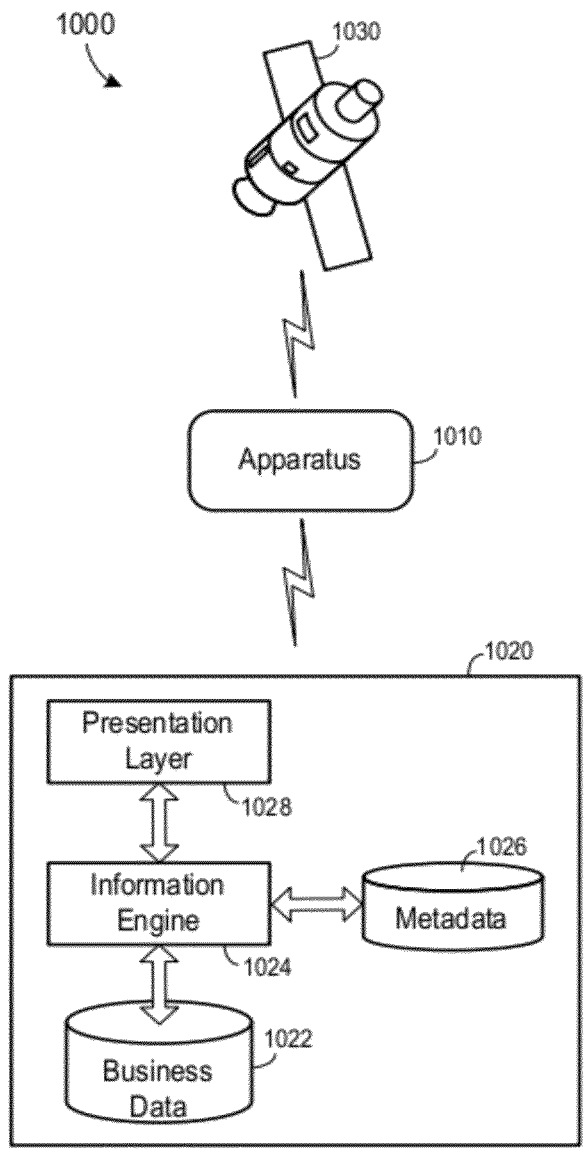
FIG. 10 is a block diagram of system according to some embodiments.

FIG. 10 illustrates system 1000 according to some embodiments. Apparatus 1010 may comprise an implementation of apparatus 100 and/or apparatus 500, but is not limited thereto. Apparatus 1010 may operate within system 1000 to perform process 800 according to some embodiments.

As mentioned above, apparatus 1010 may obtain data relating to entities of interest from any source. It will be assumed that, within the context of system 1000, the data is retrieved from enterprise computing system 1020. System 1020 includes business data 1022, information engine 1024, metadata 1026 and presentation layer 1028. Each element of enterprise computing system 1020 may be implemented by any suitable combination of hardware (e.g., one or more processors) and/or software (e.g., processor-executable program code).

Business data 1022 may comprise any query-responsive data source or sources that are or become known, including but not limited to a structured-query language (SQL) relational database management system. Embodiments are not limited to any number or types of data sources. For example, business data 1022 may comprise one or more Online Analytical Processing databases, spreadsheets, etc. The data stored in business data 1022 may be received from disparate sources (not shown).

Information engine 1024 provides data of business data 1022 to presentation layer 1028 based on metadata 1026. Presentation layer 1024 may provide interfaces accessed by apparatus 1010 to request and receive the data. Apparatus 1010 may communicate with computing system 1020 using any known protocols and through one or more disparate networks, including the Internet.

Apparatus 1010 also communicates with one or more satellite 1030 to retrieve location information. Satellite 1030 may provide Global Positioning System data used by apparatus 1010 to determine its physical location. In some embodiments, the physical location may be determined from an accelerometer and compass 912 using dead reckoning techniques. The physical location may also be determined from another device (e.g., a car navigation system) by syncing or linking with the other device. Other techniques to determine a current physical location of apparatus 900 can be used.

Figure 11:
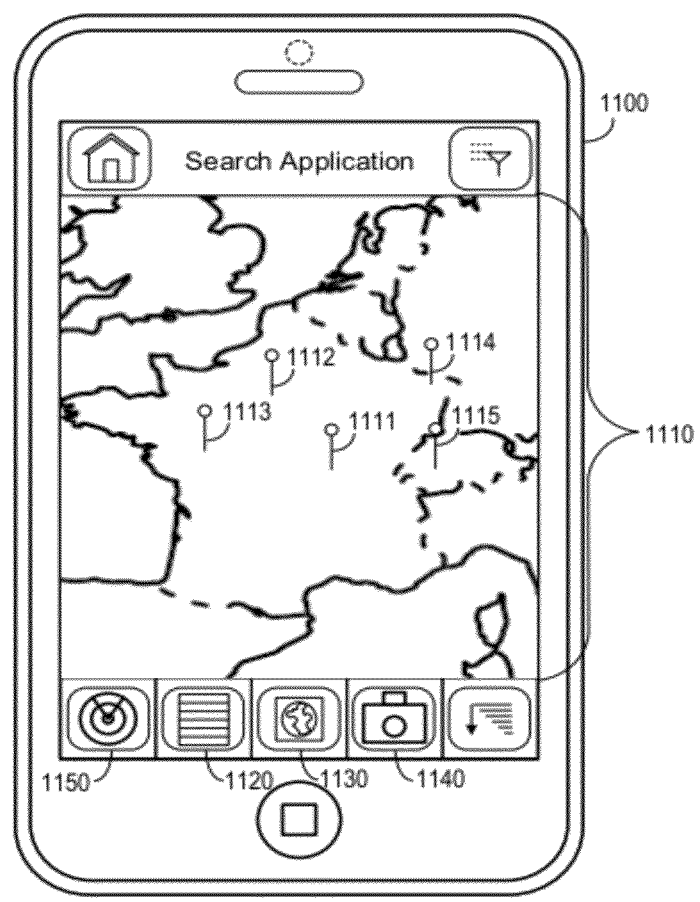
FIG. 11 is a view of a geographic map visualization presented on an apparatus according to some embodiments.
Figure 12:
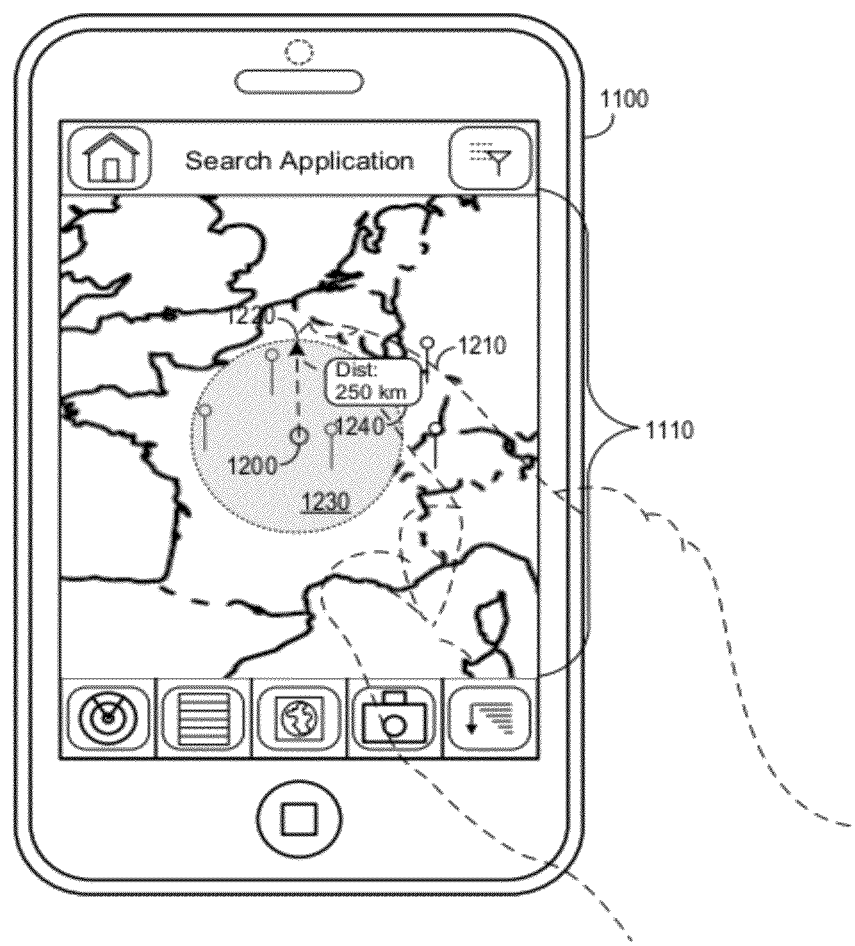
FIG. 12 is a view illustrating a drag input on a geographic map visualization presented on an apparatus according to some embodiments.
Figure 13:
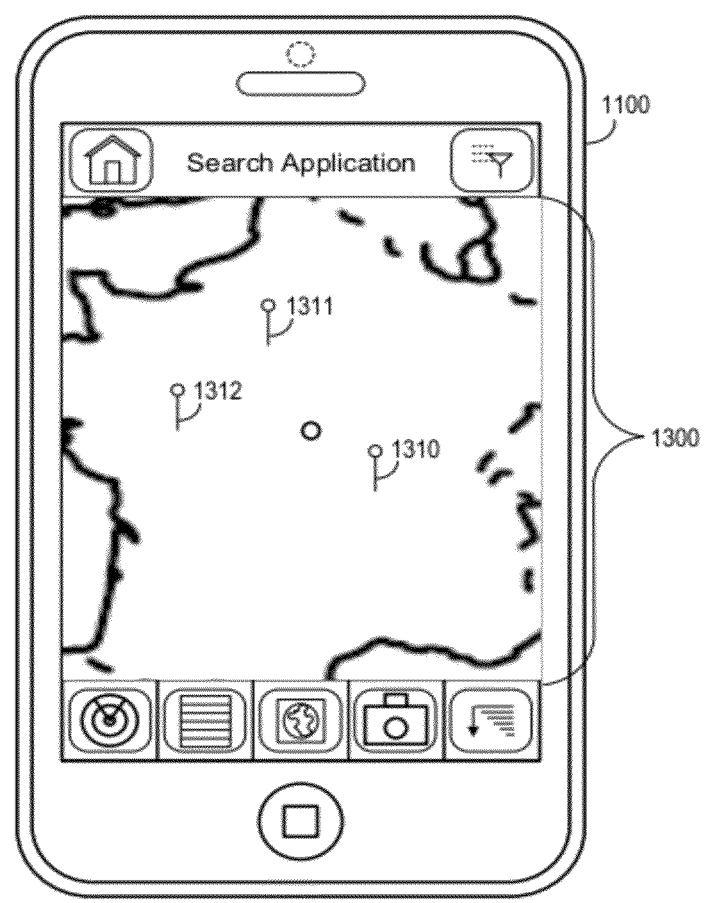
FIG. 13 is a view of a geographic map visualization including filtered graphical indicators presented on an apparatus according to some embodiments.

FIG. 11 is a view of apparatus 1100 according to some embodiments. Apparatus 1100 is a smartphone and may perform any of the functions described herein. FIGS. 11 through 13 illustrate an implementation of process 800 according to some embodiments.

Apparatus 1100 presents geographic map visualization 1110. Visualization 1110 includes graphical indicators 1111 through 1115. Each of graphical indicators 1111 through 1115 is associated with a respective entity of interest. Graphical indicators 1111 through 1115 indicate the physical locations of their respective entities of interest. Again, embodiments are not limited to the graphical indicators and visualizations described herein.

The entities of interest may have been previously determined in any manner. For example, a user may have conducted a search of the Web, of a Website, or of a data set to retrieve a result set of particular geographic locations. The search results may have been automatically displayed in map form, or the user may have selected icon 1130 to view the search results in map form. As described above, icon 1120 invokes a list visualization, and icon 1140 invokes a visualization including a camera-acquired image.

As also described above, a user may select icon 1150 to change the presented visualization to that shown in FIG. 12. FIG. 12 shows only graphical indicator 1200 indicating a current location of apparatus 1100 on visualization 1110. Some embodiments may also show a radar including concentric circles and/or a compass heading as described above. The position of each of graphical indicators 1111 through 1115 reflects a distance from its respective entity of interest to the current location of apparatus 1100, illustrated by indicator 1200.

FIG. 12 also illustrates an input received at a first portion of visualization 1110. More specifically, user finger 1210 has touched a portion of apparatus 1100 at which graphical indicator 1200 is displayed and has been dragged upward across apparatus 1100 to second portion 1220. Circle 1230 grows to track the drag input. Indicator 1240 also increments during the drag input to indicate the current geographic distance (i.e., radius) represented by circle 1230. An indicator such as indicator 1240 may exhibit any appearance and is not limited to use with geographic visualizations.

The entities of interest may be filtered upon release of finger 1210 from apparatus 1000. FIG. 13 illustrates the presentation of second visualization 1300 including graphical indicators 1310 through 1312 of the filtered entities of the present example according to some embodiments. Second visualization 1300 is also a geographic map but is at a greater zoom level than visualization 1110. This increased zoom level may provide a more detailed representation of the locations of the entities which remain after the filtering process.

Figure 14:
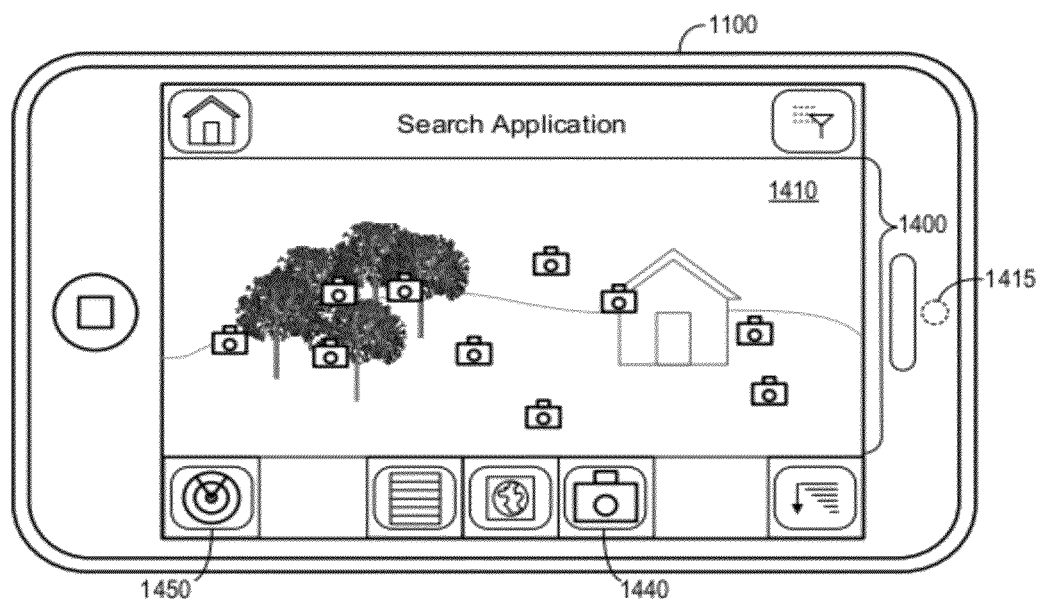
FIG. 14 is a view of a camera visualization presented on an apparatus according to some embodiments.
Figure 15:
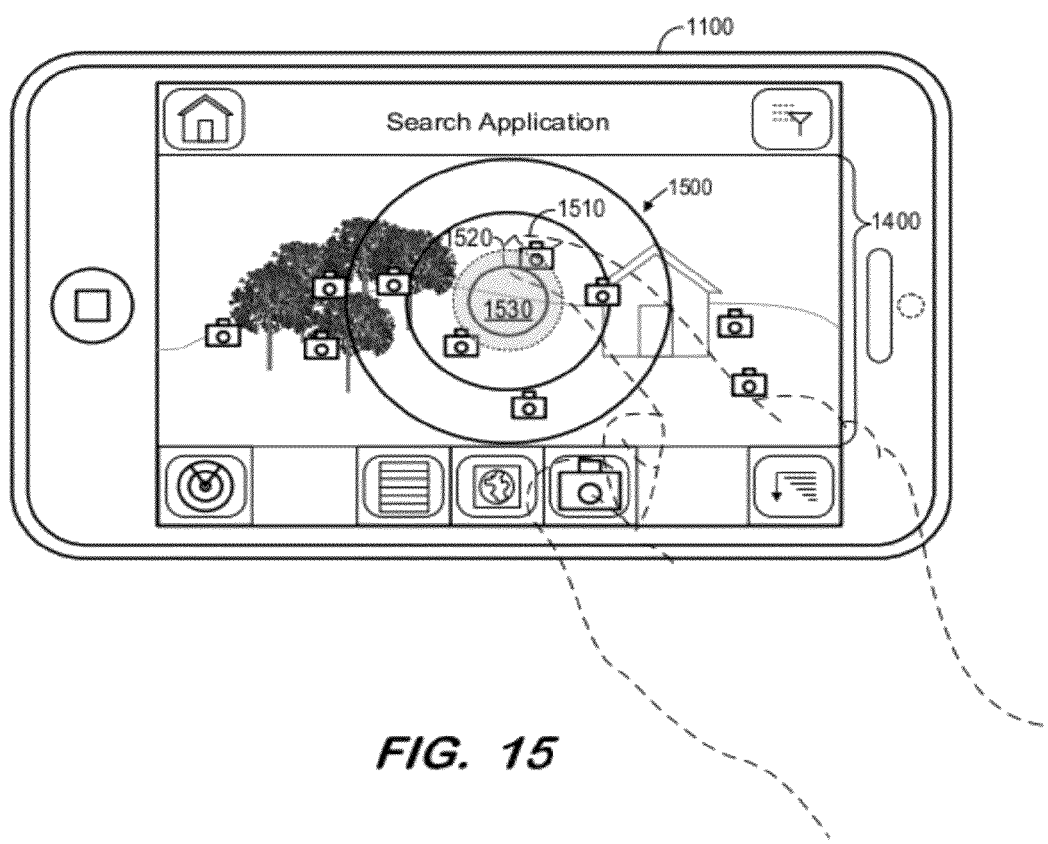
FIG. 15 is a view illustrating a drag input on a camera visualization presented on an apparatus according to some embodiments.
Figure 16:
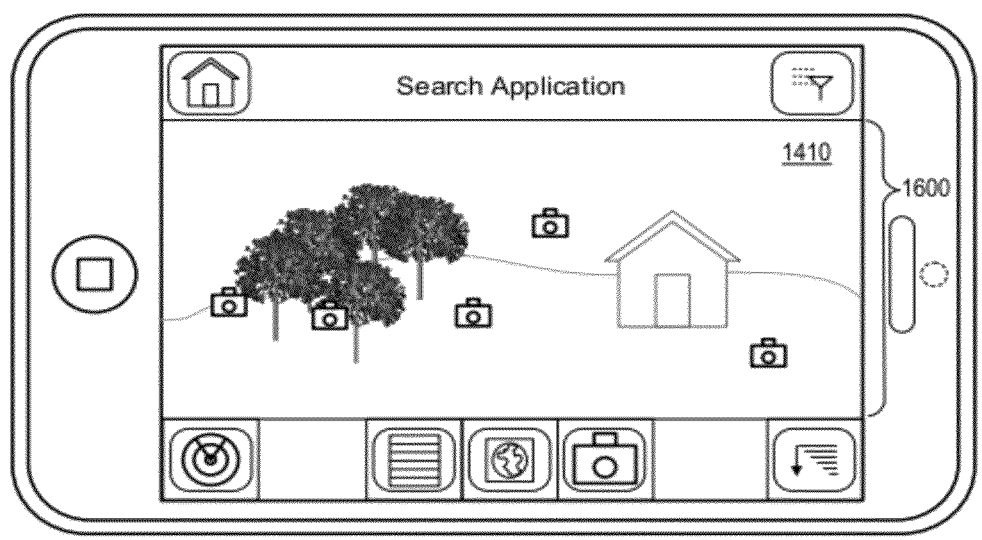
FIG. 16 is a view of a camera visualization including filtered graphical indicators presented on an apparatus according to some embodiments.

FIG. 14 is another view of apparatus 1100 according to some embodiments. FIGS. 14 through 16 illustrate an implementation of process 800 according to some embodiments.

Apparatus 1100 of FIG. 14 presents visualization 1400, which includes camera-acquired image 1410. Image 1410 may be acquired using camera 1415 of apparatus 1100 or from another source. Image 1410 may represent a scene which camera 1415 is currently facing. That is, image 1401 may comprise a "live" image.

Visualization 1400 includes ten graphical indicators, each of which is associated with a respective entity of interest. The graphical indicators indicate the direction in which each entity of interest lies, but might not represent a distance of each entity from apparatus 1100. The entities of interest and associated information may have been previously determined in any manner described herein.

The graphical indicators may have been automatically displayed on camera image 1410 while apparatus 1100 is in a camera mode, or the user may have selected icon 1440 to view the graphical indicators as shown.

The user may select icon 1450 to change the presented visualization to that shown in FIG. 15. Visualization 1400 now includes radar 1500 of concentric circles, each of which represents an increasing distance from a current physical location of apparatus 1100. Also, user finger 1510 has touched a first portion of apparatus 1100 and has been dragged upward to second portion 1520. A radius of circle 1530 grows from the first portion to the second portion.

After finger 1510 is lifted from second portion 1520, the entities of interest are filtered to retain those entities which are located closer to the current location of apparatus 1100 than the distance represented by portion 1520 of radar 1500. FIG. 16 illustrates the presentation of second visualization 1600 including five graphical indicators positioned to represent the directions in which those entities lie. Second visualization 1600 also includes camera image 1410.

The foregoing diagrams represent logical architectures for describing processes according to some embodiments, and actual implementations may include more or different components arranged in other manners. Moreover, each system described herein may be implemented by any number of devices in communication via any number of other public and/or private networks. Two or more devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

Embodiments described herein are solely for the purpose of illustration. Those in the art will recognize other embodiments may be practiced with modifications and alterations to that described above.

What is claimed is:

1. An apparatus comprising:
a display to present a visualization comprising a plurality of graphical indicators, each of the graphical indicators associated with a respective one of a plurality of entities of interest;
a touch-sensitive input surface to receive a touch input at a first portion of the visualization representing a current physical location of the apparatus and a drag input from the first portion to a second portion of the visualization; and
a processor to filter the plurality of graphical indicators based on a distance between the first portion and the second portion;
wherein filtering of the plurality of graphical indicators comprises:
determination of a second distance based on the distance between the first portion and the second portion; and
determination of at least one of the plurality of entities of interest, each of the at least one of the plurality of entities of interest located less than the second distance from the current physical location of the apparatus;
wherein the display is further to present a second visualization including a second plurality of graphical indicators, each of the second plurality of graphical indicators associated with a respective one of the at least one of the plurality of entities of interest;
wherein the visualization comprises a list of the plurality of entities of interest
wherein the second visualization comprises a second list of at least one of the plurality of entities of interest and
wherein the second plurality of graphical indicators are simultaneously displayed with the second list.

2. An apparatus according to claim 1, wherein, during the drag input, the visualization comprises an indicator of the second distance.

3. An apparatus according to claim 1, wherein the visualization comprises a plurality of concentric circles, and
wherein the visualization comprises a second plurality of graphical indicators, each of the graphical indicators associated with a respective one of the plurality of entities of interest and positioned on the plurality of concentric circles to indicate a second distance between a physical location of its respective entity of interest and the current physical location of the apparatus.

4. An apparatus according to claim 3,
wherein the center of the plurality of concentric circles is located at the first portion of the visualization representing the current physical location of the apparatus.

5. A non-transitory computer-readable medium having program code stored thereon, the program code executable by a processor to cause an apparatus to:
present a visualization comprising a plurality of graphical indicators, each of the graphical indicators associated with a respective one of a plurality of entities of interest;
receive a touch input at a first portion of the visualization representing a current physical location of the apparatus and a drag input from the first portion to a second portion of the visualization; and
filter the plurality of graphical indicators based on a distance between the first portion and the second portion;
wherein filtering of the plurality of graphical indicators comprises:
determination of a second distance based on the distance between the first portion and the second portion; and
determination of at least one of the plurality of entities of interest, each of the at least one of the plurality of entities of interest located less than the second distance from the current physical location of the apparatus;
the program code further executable by a processor to present a second visualization including a second plurality of graphical indicators, each of the second plurality of graphical indicators associated with a respective one of the at least one of the plurality of entities of interest;
wherein the visualization comprises a list of the plurality of entities of interest
wherein the second visualization comprises a second list of at least one of the plurality of entities of interest and
wherein the second plurality of graphical indicators are simultaneously displayed with the second list.

6. A medium according to claim 5, wherein, during the drag input, the visualization comprises an indicator of the second distance.

7. A medium according to claim 5, wherein the visualization comprises a plurality of concentric circles, and
wherein the visualization comprises a second plurality of graphical indicators, each of the graphical indicators associated with a respective one of the plurality of entities of interest and positioned on the plurality of concentric circles to indicate a second distance between a physical location of its respective entity of interest and the current physical location of the apparatus.

8. A medium according to claim 7,
wherein the center of the plurality of concentric circles is located at the first portion of the visualization representing the current physical location of the apparatus.

9. A method comprising:
presenting a visualization comprising a plurality of graphical indicators on a display, each of the graphical indicators associated with a respective one of a plurality of entities of interest;
receiving, on a touch-sensitive device, a touch input at a first portion of the visualization representing a current physical location of the apparatus and a drag input from the first portion to a second portion of the visualization; and
filtering, using a processor, the plurality of graphical indicators based on a distance between the first portion and the second portion;
wherein filtering of the plurality of graphical indicators comprises:
determining a second distance based on the distance between the first portion and the second portion; and
determining at least one of the plurality of entities of interest, each of the at least one of the plurality of entities of interest located less than the second distance from the current physical location of the apparatus;
the method further comprising:
presenting a second visualization including a second plurality of graphical indicators, each of the second plurality of graphical indicators associated with a respective one of the at least one of the plurality of entities of interest;
wherein the visualization comprises a list of the plurality of entities of interest
wherein the second visualization comprises a second list of at least one of the plurality of entities of interest and
wherein the second plurality of graphical indicators are simultaneously displayed with the second list.

10. An apparatus according to claim 1, wherein the touch-sensitive input surface is further to receive a touch input at a portion of the visualization that does not represent the current physical location but is interpreted to represent a current physical position of the apparatus.

\* \* \* \* \*